United States Patent [19]

Shibata

[11] Patent Number: 5,654,830
[45] Date of Patent: Aug. 5, 1997

[54] ZOOM LENS SYSTEM

[75] Inventor: Hironori Shibata, Hachioji, Japan

[73] Assignee: Olympus Optical Co., Ltd., Tokyo, Japan

[21] Appl. No.: 555,904

[22] Filed: Nov. 13, 1995

[30]     Foreign Application Priority Data

Nov. 11, 1994  [JP]  Japan ................................. 6-277902
Dec. 12, 1994  [JP]  Japan ................................. 6-307311

[51] Int. Cl.$^6$ ................................................ G02B 15/14
[52] U.S. Cl. ................................... 359/692; 359/714
[58] Field of Search .............................. 359/692, 690, 359/688, 687, 714

[56]               References Cited

FOREIGN PATENT DOCUMENTS 5-113537   5/1993   Japan .
6-18783    1/1994   Japan .
6-130298   5/1994   Japan .

*Primary Examiner*—Scott J. Sugarman
*Attorney, Agent, or Firm*—Cushman, Darby & Cushman IP Group of Pillsbury Madison & Sutro LLP

[57]               ABSTRACT

A compact yet high-performance zoom lens system which is well corrected in terms of aberrations, includes reduced number of lens elements and has a reduced total lens thickness. The system has a first lens group G1 including, in order from the object side, a lens having a meniscus shape convex on the object side and negative refracting power (first lens), a lens of weak refracting power (second lens) and a lens having positive refracting power together with at least one aspheric surface (third lens). The first lens group has a positive refracting power in its entirety. The system further has a second lens group G2, the focal length of the overall system being variable by varying an axial separation between the first and second lens groups G1 and G2, and conforms to the following condition: (1) relation to the refracting power range of the lens of weak refracting power and the following condition (2) relating to the axial position of the lens of weak refracting power:

$$-0.35 < f_W/f_{LW} < 0.9 \quad (1)$$

$$0 \le D_4/D_2 < 1.3 \quad (2)$$

where $f_W$ is the focal length of the overall system at the wide-angle end, $f_{LW}$ is the focal length of the second lens, $D_2$ is the axial distance between the second lens and the first lens which is located on the object side thereof, and $D_4$ is the axial distance between the second lens and the third lens which is located on the image side thereof.

17 Claims, 2 Drawing Sheets

(Wide-angle end)

(Telephoto end)

(Wide-angle end)

(Telephoto end)

ZOOM LENS SYSTEM

BACKGROUND OF THE INVENTION

The present invention relates generally to a zoom lens system, and more particularly to a zoom lens system suitable for use on compact cameras, in which little limitation, if any, is placed on the back focus.

So far, a so-called two-group zoom lens system comprising two lens groups has been known as the simplest zoom lens system. This system, because of having advantages such as a simplified lens barrel, is often used for zoom lenses having a relatively low zoom ratio of up to about 3.

Applicant has already filed JP-A 5(1993)-113537 for a two-group zoom lens system which comprises a reduced number of lens elements and so is inexpensive.

However, a reduction in the number of lens elements involved renders aberrations worse and so is in contradiction to correction of aberrations. The zoom lens system disclosed in the above-mentioned specification is less than satisfactory in terms of compactness because the sum of the axial separations between the respective groups (the total lens thickness) is large due to the arrangement of the first group.

SUMMARY OF THE INVENTION

In view of the above-mentioned problems associated with the prior art, an object of the present invention is to provide a compact yet high-performance zoom lens system which is well corrected in terms of aberrations although it is made up of a reduced number of lens elements, and has a reduced total lens thickness as well.

According to the present invention, the above-mentioned object is achieved by the provision of a zoom lens system including, in order from the object side, a first lens group having a positive refracting power and a second lens group a having a negative refracting power, with the focal length varied by varying a separation between said first and second lens groups. In this system the first lens group includes a lens component having weak refracting power, a negative meniscus lens component which is located on the object side of the lens component of weak refracting power and is convex on the object side and a positive lens component located on the image side of the lens component of weak refracting power, and conforms to the following conditions (1) and (2):

$$-0.35 < f_W/f_{LW} < 0.9 \quad (1)$$

$$0 \leq D_4/D_2 < 1.3 \quad (2)$$

Here $f_W$ is the focal length of the overall system at the wide-angle end, $f_{LW}$ is the focal length of said lens component of weak refracting power in the first lens group, $D_2$ is the axial distance between the lens component of weak refracting power in the first lens group and the lens component of negative refracting power which is located on the object side thereof, and $D_4$ is the axial distance between the lens component of weak refracting power in the first lens group and the lens component of positive refracting power which is located on the image side thereof.

Preferably, the above-mentioned lens component of weak refracting power has positive refracting power and conforms to the following condition (1)':

$$0 < f_W/f_{LW} < 0.9 \quad (1)'$$

More preferably, the lens component of weak refracting power has a meniscus shape convex on the object side.

Reference will now be made to why the above-mentioned arrangements are adopted and how they work.

Referring first to the first lens group of positive refracting power, it is desired for negative and positive lenses to be located on the object and image sides of the first lens group, respectively, for the purpose of correcting chromatic aberration and ensuring the back focus.

It is here required that the negative lens located on the object side be of a meniscus shape convex on the object side. The reason is that since rays, especially off-axis rays, passing through such a negative lens is at considerable height, it is required to prevent degradation of the peripheral portion of the image. This meniscus shape enables the quantity of refraction of the off-axis rays to be reduced, whereby off-axis aberrations such as coma and astigmatism can be so reduced that the ability to form images can be achieved all over the image plane.

When the power of each lens is increased to achieve compactness, a problem arises in that, it is difficult to correct higher-order aberrations produced at each lens. This problem also arises when the axial separation is reduced. In other words, it is impossible to improve the ability to form images unless higher-order aberrations are corrected.

In the present invention, therefore, satisfactory correction of aberrations is achieved by locating a lens of weak power between the above-mentioned negative and positive lenses. In this case, the above-mentioned conditions (1) and (2) should be satisfied.

Cond. (1) gives a definition of the power range of the lens of weak power. It is noted that the first lens group is a positive group; that is, the positive component is stronger in power than the negative component in the first lens group. When the lens of weak power becomes too strong in negative power, i.e., when the lower limit of −0.35 in Cond. (1) is not reached, the positive power of the first lens group becomes too strong, thus making aberrations worse and resulting in an increase in the number of lens elements involved. When the upper limit of 0.9 in Cond. (1) is exceeded, i.e., when the power of this lens becomes too strong, the power of the positive lens positioned next thereto becomes weak. This in turn causes the position of the principal point to be moved toward the object side and so renders it difficult to ensure the back focus.

The use of a lens of weak power offers advantages such as a limited variation of the focal position due to temperature changes, even when it is formed of plastic material. Cond. (2) gives a definition of the position of the lens of weak power on the optical axis. Unless the negative and positive lenses of the first lens groups should be positioned with some axial separation between them, difficulty is to be involved in correcting off-axis aberrations in a well-balanced state. With this in mind, it is advantageous to fill such an air separation with the lens of weak power because available space can effectively be used, thus leading to compactness. At this position both axial and off-axis rays are at suitable heights so that aberrations can be corrected in a well-balanced state. In other words, that this lens of weak power is positioned on the object side implies that correction of aberrations is made where off-axis rays are at considerable height. Therefore, with the upper limit of 1.3 in Cond. (2) exceeded, the lens of weak power comes too close to the object side. This in turn causes the quantity of off-axis aberrations produced at this lens to become too large, making it difficult to maintain the off-axis ability to form images.

To achieve a reduction in the number of lens elements involved or compactness, the first lens group should have at least one aspheric surface, because it is then possible to correct aberrations produced in large quantities, as above mentioned.

According to the present invention as above explained, it is possible to achieve a zoom lens system which can make a reasonable compromise between compactness and performance. By satisfying the following condition, however, it is possible to achieve a zoom lens system much more improved in the ability to form images.

For increased power or compactness, it is more preferable to use a positive lens as the above-mentioned lens of weak power. This is because if this lens has negative power, the burden born by the remaining positive lens in the first lens group will be relieved. As already mentioned, Cond. (1) gives a definition of the power range of the lens of weak power. Most preferably, Cond. (1)' should reduce to $$0 < f_W/f_{LW} < 0.6 \qquad (1)''$$

The power range as defined just above makes the balance between the negative and positive powers in the first lens group optimum and so is preferable for correction of aberrations.

By allowing the above-mentioned lens of weak power to have a meniscus shape convex on the object side, a reduction in the ability of the lens of weak power located relatively nearer to the image side to correct off-axis aberrations can be compensated for. In particular, it is favorable to correct coma and astigmatism produced at the negative lens located on the object side.

However, any departure from the meniscus shape is not preferable because a non-meniscus lens, even when it has the same power, remains small in terms of the curvature of the object-side surface and so cannot compensate for off-axis aberrations produced at the negative lens.

The second lens group of the present zoom lens system includes one positive lens and is further made up of one positive lens and one negative lens, so that the present zoom lens system can be much more improved in terms of the ability to form images at reduced costs.

As above mentioned, the second lens group includes at least one positive lens. By incorporating the positive lens in the second lens group having negative power, it is possible to reduce the quantity of chromatic aberration. This is especially favorable for a zoom lens system having a zoom ratio of the order of 2 because an image of high contrast is achievable over the image plane.

Most preferably, the second lens group is made up of one positive lens and one negative lens, because the above-mentioned chromatic aberration reduction is achievable at a minimum cost.

In view of correction of aberrations and cost, the most efficient arrangement of the first lens group is made up of a first or negative lens, a second lens of weak power and a third or positive lens or, in other words, one negative lens and one positive lens.

The cementing of the second lens to the third lens, too, is preferable because an adverse influence of decentration is reduced and the zoom lens system of the present invention can easily be produced at lower costs.

By conforming to the following condition (3), it is possible to provide a more compact, more inexpensive yet higher-performance zoom lens system.

$$-1.5 < f_W/f_{L1} < -0.3 \qquad (3)$$

Here $f_W$ is the focal length of the overall system at the wide-angle end and $f_{L1}$ is the focal length of the first lens of the first lens group.

Cond. (3) gives a definition of the power of the negative lens nearest to the object side. By allowing this lens to have reasonable power, it is possible to make the quantity of the back focus or the quantity of off-axis aberrations reasonable. More specifically, when the upper limit of −0.3 is exceeded, the power of this lens becomes too weak to ensure the back focus. When the lower limit of −1.5 is not reached, on the contrary, the power of this lens becomes too strong, not only resulting in an increase in the off-axis aberrations produced at the negative lens but also incurring an increase in the number of lens elements needed for compensating for degradation of the ability to form images, although the back focus can be well ensured.

More preferably, Cond. (3) should reduce to $$-1.2 < f_W/f_{L1} < -0.5 \qquad (3)'$$

Within the above-defined range, the best-balanced compromise is made between the ensuring of the back focus and the aberrations produced at the first lens.

In the zoom lens system of the present invention, the radius of curvature of the first surface of the first lens is limited to the following range, so that the quantity of off-axis aberrations produced can particularly be reduced with an expected improvement in the ability to form images.

$$0.3 < r_{NF}/f_W < 2.0 \qquad (4)$$

Here $r_{NF}$ is the radius of curvature of the object-side surface of the negative lens of the first lens group located on the object side and fW is the focal length of the overall system at the wide-angle end.

In other words, the radius of curvature of the object-side surface of the negative lens located on the object side should lie within a reasonable range preset depending on the focal length of the overall system at the wide-angle end, so that the quantity of aberrations produced at this lens can be made reasonable. When the upper limit of 2.0 in Cond. (4) is exceeded, the radius of curvature of the first surface becomes too large. This in turn causes the angle of incidence of rays on the peripheral portion of the image plane to become particularly large, thus resulting in an increase in the quantity of aberrations produced at this surface and making it difficult to keep off-axis performance in good condition. When the lower limit of 0.3 is not reached, on the contrary, the radius of curvature of the image-side surface in particular becomes too small when the power of the lens lies in a certain preset range. This is not preferable because the quantity of higher-order aberrations produced at this surface becomes too large.

More preferably, Cond. (4) should reduce to $$0.4 < r_{NF}/f_W < 1.6 \qquad (4)'$$

With the above-defined range, the best-balanced compromise is made between the aberrations produced at the object- and image-side surfaces of the above-mentioned negative lens.

In the zoom lens system of the present invention, it is particularly preferable that a stop is located in the rear of the first lens group or in front of the second lens group because of considerable simplification of the lens barrel structure.

As can be seen from the foregoing, the present invention can provide a well-balanced, compact yet high-performance zoom lens system which comprises a reduced number of lens elements and so is inexpensive.

In the zoom lens system of the present invention, the ability to form images can be further improved by placing restrictions on the position and shape of an aspheric surface in the first lens group.

More specifically, it is desired to incorporate an aspheric surface—which becomes strong in negative power as it is farther off the optical axis—in the negative lens of a meniscus shape convex on the object side, particularly because under spherical aberration or off-axis aberrations remarkably produced when the positive power is increased for compactness, or higher-order aberrations thereof can be corrected in a well-balanced state.

Alternatively, axial and off-axis aberrations can be put in a well-balanced state over a wider range by using an aspheric surface for the lens of weak power.

The incorporation of an aspheric surface in the second lens group, too, is effective for correction of aberrations and, hence, for reductions in both the total length of the zoom lens system and the number of lens elements used.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 5 of the zoom lens system according to the present invention will now be explained.

Figure 1:
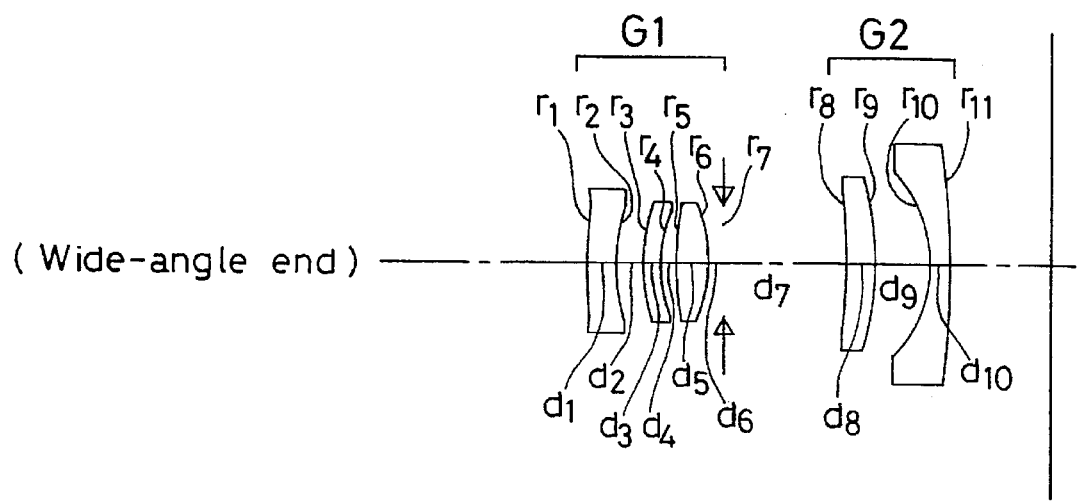
FIG. 1 is sectional views of the group arrangements in Example 1 of the zoom lens system at the wide-angle and telephoto ends, respectively.
Figure 1:
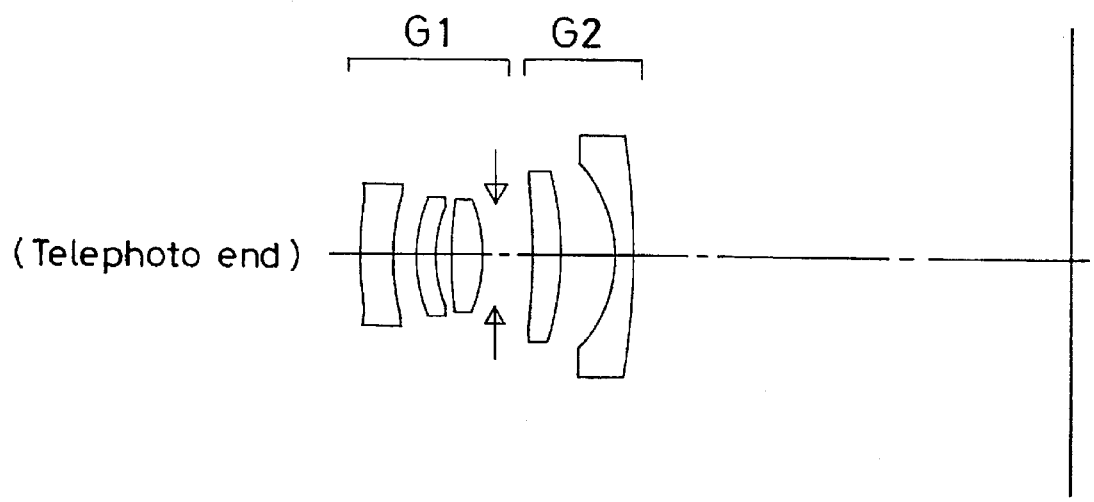
Figure 2:
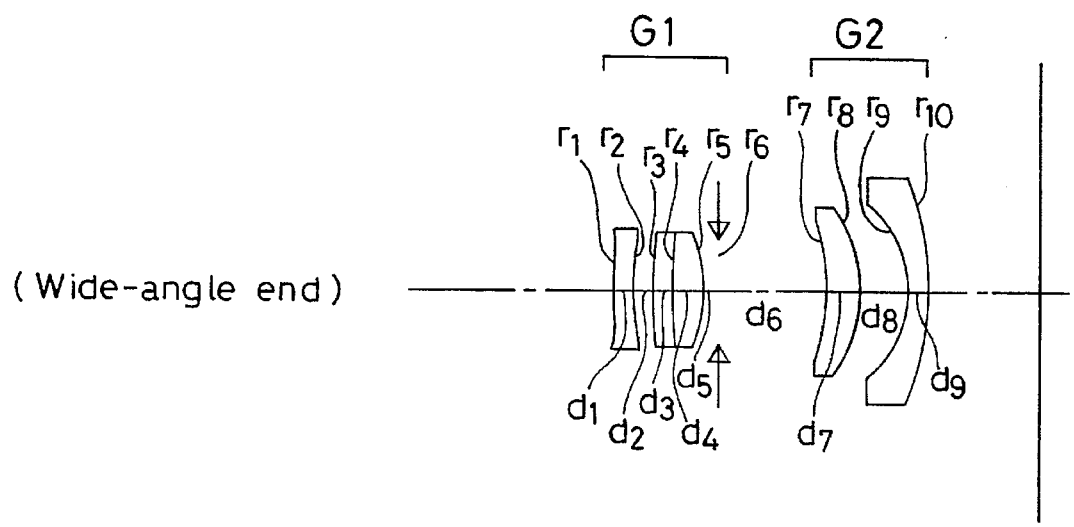
FIG. 2 is sectional views of the group arrangements of Example 4 of the zoom lens system at the wide-angle and telephoto ends, respectively.
Figure 2:
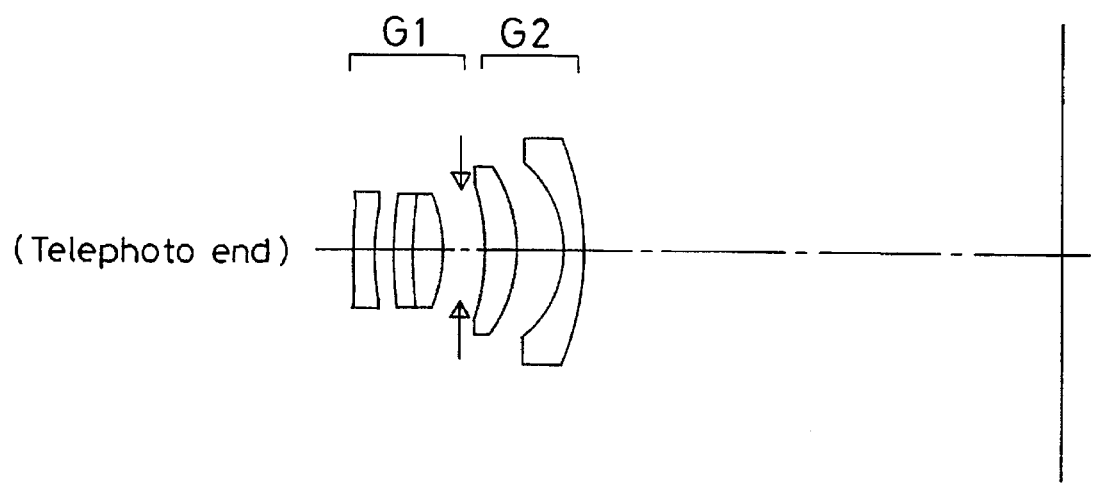

Numerical data about each example will be given later. FIGS. 1 and 2 are sectional views of the group arrangements in Examples 1 and 4 of the zoom lens system at the wide-angle and telephoto ends, respectively. It is here noted that Examples 2, 3 and 5, each being similar in construction to Example 1, are not illustrated.

Throughout Examples 1 to 5, the first lens of the first lens group G1 is a negative meniscus lens convex on the object side. In Example 1 the second lens of the first lens group G1 is a negative meniscus lens convex on the object side, and throughout Examples 2 to 5 the second lens of the first lens group G1 is a positive meniscus lens convex on the object side. Throughout Examples 1 to 5 the third lens of the first lens groups G1 is a positive double-convex lens. In Example 4 the second and third lenses are constructed in the form of a doublet.

Throughout Examples 1 to 5 the second lens group G2 consists of a first or positive meniscus lens convex on the image side and a second or negative meniscus lens concave on the object side.

Throughout Examples 1 to 5 a stop is located in the rear of the final lens of the first lens group G1 as an integral piece.

In Examples 1–3 and 5 three aspheric surfaces are used, one for the front surface of the first lens of the first lens group G1, one for the front surface of the second lens of the first lens group G1 and one for the front surface of the first lens of the second lens group G2, and in Example 4 four aspheric surfaces are used, two for both surfaces of the first lens of the first lens group G1 and the other two for both surfaces of the first lens of the second lens group G2.

Throughout Examples 1 to 5, the aspheric surface used for the object-side surface of the negative meniscus lens of the first lens group G1 is of such configuration that its negative power becomes strong as it is farther off the optical axis, the aspheric surface used for the lens of weak power is of such configuration that its positive power becomes strong as it is farther off the optical axis, and the aspheric surface used in the positive lens of the second lens group G2 is of such configuration that its positive power becomes strong as it is farther off the optical axis.

Set out below are numerical data about each data. Symbols used hereinafter but not hereinbefore mean:

f is the focal length of the overall system, $F_{NO}$ is the F-number, $2\omega$ is the field angle, $f_B$ is the back focus, $r_1, r_2, \ldots$ are the radii of curvature of the respective lens surfaces, $d_1, d_2, \ldots$ are the separations between the respective lens surfaces, $n_{d1}, n_{d2}, \ldots$ the d-line indices of refraction of the respective lenses, and $v_{d1}, v_{d2}, \ldots$ the Abbe's number of the respective lenses. Here let x and y denote the direction of propagation of light on the optical axis and the direction perpendicular thereto. Then, aspheric shape or configuration is given by $$x = (y^2/r)/[1+\{1-(y/r)^2\}^{1/2}] + A_4 y^4 + A_6 y^6 + A_8 y^8 + A_{10} y^{10} + A_{12} y^{12}$$

Here r is the paraxial radius of curvature, and $A_4, A_6, A_8, A_{10}$ and $A_{12}$ are fourth, sixth, eighth, tenth and twelfth aspherical coefficients.

Example 1 f = 36.3~70.2
$F_{NO}$ = 4.2~8.0
$2\omega$ = 61.6°~34.3°
$f_B$ = 9.39~40.8

| | | | | | |
|---|---|---|---|---|---|
| $r_1$ = 47.1349 (Aspheric) | $d_1$ = 2.970 | | $n_{d1}$ = 1.78470 | | $v_{d1}$ = 26.30 |
| $r_2$ = 19.6648 | $d_2$ = 2.580 | | | | |
| $r_3$ = 15.9031 (Aspheric) | $d_3$ = 1.790 | | $n_{d2}$ = 1.52542 | | $v_{d2}$ = 55.78 |
| $r_4$ = 13.1042 | $d_4$ = 1.380 | | | | |
| $r_5$ = 30.8244 | $d_5$ = 3.070 | | $n_{d3}$ = 1.58913 | | $v_{d3}$ = 61.18 |
| $r_6$ = –13.3300 | $d_6$ = 0.960 | | | | |
| $r_7$ = ∞ (Stop) | $d_7$ = (Variable) | | | | |
| $r_8$ = –63.0842 (Aspheric) | $d_8$ = 2.860 | | $n_{d4}$ = 1.58423 | | $v_{d4}$ = 30.49 |
| $r_9$ = –28.7502 | $d_9$ = 5.250 | | | | |
| $r_{10}$ = –12.2691 | $d_{10}$ = 1.880 | | $n_{d5}$ = 1.83481 | | $v_{d5}$ = 42.72 |
| $r_{11}$ = –71.1426 | | | | | |

Zooming Spaces f     36.3     70.2
d     11.9096  3.6919

Aspherical Coefficients

1st surface $A_4$ = –0.14762 × 10$^{-3}$
$A_6$ = –0.42063 × 10$^{-6}$
$A_8$ = –0.13720 × 10$^{-7}$
$A_{10}$ = 0.23318 × 10$^{-9}$
$A_{12}$ = –0.18888 × 10$^{-11}$ 3rd surface $A_4$ = 0.11108 × 10$^{-3}$
$A_6$ = –0.55473 × 10$^{-6}$
$A_8$ = 0.25936 × 10$^{-7}$
$A_{10}$ = –0.74807 × 10$^{-9}$
$A_{12}$ = 0.61603 × 10$^{-11}$ 8th surface $A_4$ = 0.40249 × 10$^{-4}$
$A_6$ = –0.75828 × 10$^{-6}$
$A_8$ = 0.43302 × 10$^{-7}$
$A_{10}$ = –0.84750 × 10$^{-9}$ $A_{12} = 0.58702 \times 10^{-11}$
(1) $f_W/f_{LW} = -0.2$
(2) $D_4/D_2 = 0.53$
(3) $f_W/f_{L1} = -0.8$
(4) $r_{NF}/f_W = 1.3$ Example 2

$f = 36.3\sim70.2$
$F_{NO} = 4.1\sim8.0$
$2\omega = 61.6°\sim34.3°$
$f_B = 10.1\sim45.0$

| | | | |
|---|---|---|---|
| $r_1 = 29.5317$ (Aspheric) | $d_1 = 2.460$ | $n_{d1} = 1.78470$ | $\nu_{d1} = 26.30$ |
| $r_2 = 15.7988$ | $d_2 = 2.720$ | | |
| $r_3 = 16.4352$ (Aspheric) | $d_3 = 1.880$ | $n_{d2} = 1.67270$ | $\nu_{d2} = 32.10$ |
| $r_4 = 16.2290$ | $d_4 = 0.950$ | | |
| $r_5 = 59.8158$ | $d_5 = 3.130$ | $n_{d3} = 1.58913$ | $\nu_{d3} = 61.18$ |
| $r_6 = -12.0428$ | $d_6 = 1.000$ | | |
| $r_7 = \infty$ (Stop) | $d_7 =$ (Variable) | | |
| $r_8 = -31.2352$ (Aspheric) | $d_8 = 3.290$ | $n_{d4} = 1.58423$ | $\nu_{d4} = 30.49$ |
| $r_9 = -20.1611$ | $d_9 = 4.300$ | | |
| $r_{10} = -10.4354$ | $d_{10} = 1.880$ | $n_{d5} = 1.83481$ | $\nu_{d5} = 42.72$ |
| $r_{11} = -30.6227$ | | | |

Zooming Spaces

| f | 36.3 | 70.2 |
|---|---|---|
| d | 11.2443 | 2.6998 |

Aspherical Coefficients

1st surface $A_4 = -0.14457 \times 10^{-3}$
$A_6 = -0.71581 \times 10^{-6}$
$A_8 = -0.20078 \times 10^{-7}$
$A_{10} = 0.34199 \times 10^{-9}$
$A_{12} = -0.34421 \times 10^{-11}$ 3rd surface $A_4 = 0.59045 \times 10^{-4}$
$A_6 = -0.18217 \times 10^{-6}$
$A_8 = 0.15978 \times 10^{-7}$
$A_{10} = -0.47980 \times 10^{-9}$
$A_{12} = 0.38659 \times 10^{-11}$ 8th surface $A_4 = 0.70915 \times 10^{-4}$
$A_6 = -0.56919 \times 10^{-6}$
$A_8 = 0.41662 \times 10^{-7}$
$A_{10} = -0.73427 \times 10^{-9}$
$A_{12} = 0.50883 \times 10^{-11}$
(1) $f_W/f_{LW} = 0.15$
(2) $D_4/D_2 = 0.35$
(3) $f_W/f_{L1} = -0.77$
(4) $r_{NF}/f_W = 1.2$ Example 3

$f = 36.3\sim70.2$
$F_{NO} = 4.2\sim8.0$
$2\omega = 61.6°\sim34.3°$
$f_B = 8.97\sim42.1$

| | | | |
|---|---|---|---|
| $r_1 = 33.1783$ (Aspheric) | $d_1 = 2.670$ | $n_{d1} = 1.78470$ | $\nu_{d1} = 26.30$ |
| $r_2 = 15.4961$ | $d_2 = 1.720$ | | |
| $r_3 = 14.3811$ (Aspheric) | $d_3 = 1.890$ | $n_{d2} = 1.58423$ | $\nu_{d2} = 30.49$ |
| $r_4 = 15.5959$ | $d_4 = 2.110$ | | |
| $r_5 = 57.3968$ | $d_5 = 3.190$ | $n_{d3} = 1.58913$ | $\nu_{d3} = 61.18$ |
| $r_6 = -12.6154$ | $d_6 = 1.900$ | | |
| $r_7 = \infty$ (Stop) | $d_7 =$ (Variable) | | |
| $r_8 = -36.2297$ (Aspheric) | $d_8 = 3.160$ | $n_{d4} = 1.58423$ | $\nu_{d4} = 30.49$ |
| $r_9 = -21.9080$ | $d_9 = 4.560$ | | |
| $r_{10} = -11.0970$ | $d_{10} = 1.950$ | $n_{d5} = 1.83481$ | $\nu_{d5} = 42.72$ |
| $r_{11} = -38.3569$ | | | |

Zooming Spaces

| f | 36.3 | 70.2 |
|---|---|---|
| d | 11.8481 | 3.1383 |

Aspherical Coefficients

1st surface $A_4 = -0.13779 \times 10^{-3}$
$A_6 = -0.67508 \times 10^{-6}$
$A_8 = -0.85624 \times 10^{-8}$
$A_{10} = 0.18845 \times 10^{-9}$
$A_{12} = -0.21726 \times 10^{-11}$ 3rd surface $A_4 = 0.68185 \times 10^{-4}$
$A_6 = -0.15924 \times 10^{-6}$
$A_8 = 0.72943 \times 10^{-8}$
$A_{10} = -0.38777 \times 10^{-9}$
$A_{12} = 0.33670 \times 10^{-11}$ 8th surface $A_4 = 0.53813 \times 10^{-4}$
$A_6 = -0.51192 \times 10^{-6}$
$A_8 = 0.40197 \times 10^{-7}$
$A_{10} = -0.77731 \times 10^{-9}$
$A_{12} = 0.54059 \times 10^{-11}$
(1) $f_W/f_{LW} = 0.18$
(2) $D_4/D_2 = 1.23$
(3) $f_W/f_{L1} = -1.10$
(4) $r_{NF}/f_W = 0.91$ Example 4

$f = 36.3\sim70.2$
$F_{NO} = 4.1\sim8.0$
$2\omega = 61.6°\sim34.3°$
$f_B = 10.9\sim46.1$

| | | | |
|---|---|---|---|
| $r_1 = 46.6136$ (Aspheric) | $d_1 = 2.070$ | $n_{d1} = 1.80518$ | $\nu_{d1} = 25.43$ |
| $r_2 = 19.0365$ (Aspheric) | $d_2 = 2.080$ | | |
| $r_3 = 65.9753$ | $d_3 = 1.840$ | $n_{d2} = 1.69895$ | $\nu_{d2} = 30.12$ |
| $r_4 = 166.6962$ | $d_4 = 3.240$ | $n_{d3} = 1.58913$ | $\nu_{d3} = 61.18$ |
| $r_5 = -11.4145$ | $d_5 = 1.000$ | | |
| $r_6 = \infty$ (Stop) | $d_6 =$ (Variable) | | |
| $r_7 = -23.1040$ (Aspheric) | $d_7 = 3.099$ | $n_{d4} = 1.58423$ | $\nu_{d4} = 30.49$ |
| $r_8 = -16.7126$ (Aspheric) | $d_8 = 4.780$ | | |
| $r_9 = -9.9056$ | $d_9 = 1.880$ | $n_{d5} = 1.83481$ | $\nu_{d5} = 42.72$ |
| $r_{10} = -27.4430$ | | | |

Zooming Spaces

| f | 36.3 | 70.2 |
|---|---|---|
| d | 10.7227 | 2.6825 |

Aspherical Coefficients

1st surface $A_4 = -0.42268 \times 10^{-3}$
$A_6 = -0.47355 \times 10^{-6}$
$A_8 = -0.99212 \times 10^{-8}$
$A_{10} = 0.56471 \times 10^{-9}$
$A_{12} = -0.96516 \times 10^{-11}$ 2nd surface $A_4 = -0.33027 \times 10^{-3}$
$A_6 = 0.10777 \times 10^{-5}$
$A_8 = 0.28897 \times 10^{-7}$
$A_{10} = -0.73282 \times 10^{-10}$
$A_{12} = -0.23293 \times 10^{-11}$ 7th surface $A_4 = 0.26222 \times 10^{-4}$
$A_6 = -0.40884 \times 10^{-6}$
$A_8 = 0.13422 \times 10^{-7}$
$A_{10} = -0.26062 \times 10^{-9}$
$A_{12} = -0.48987 \times 10^{-11}$ 8th surface $A_4 = -0.36444 \times 10^{-4}$
$A_6 = -0.41730 \times 10^{-7}$
$A_8 = -0.27254 \times 10^{-7}$
$A_{10} = 0.56030 \times 10^{-9}$
$A_{12} = -0.77202 \times 10^{-11}$
(1) $f_W/f_{LW} = 0.234$
(2) $D_4/D_2 = 0$ -continued (3) $f_W/f_{L1} = -0.88$
(4) $r_{NF}/f_W = 1.3$ Example 5

$f = 36.3 \sim 70.2$
$F_{NO} = 4.2 \sim 8.0$
$2\omega = 61.6° \sim 34.3°$
$f_B = 9.07 \sim 39.9$

| | | | |
|---|---|---|---|
| $r_1 = 19.7735$ (Aspheric) | $d_1 = 2.820$ | $n_{d1} = 1.84666$ | $v_{d1} = 23.78$ |
| $r_2 = 11.4136$ | $d_2 = 2.530$ | | |
| $r_3 = 12.7280$ (Aspheric) | $d_3 = 1.950$ | $n_{d2} = 1.67270$ | $v_{d2} = 32.10$ |
| $r_4 = 15.8246$ | $d_4 = 1.190$ | | |
| $r_5 = 566.7798$ | $d_5 = 3.220$ | $n_{d3} = 1.58913$ | $v_{d3} = 61.18$ |
| $r_6 = -11.1298$ | $d_6 = 1.810$ | | |
| $r_7 = \infty$ (Stop) | $d_7 =$ (Variable) | | |
| $r_8 = -65.4909$ (Aspheric) | $d_8 = 5.420$ | $n_{d4} = 1.58423$ | $v_{d4} = 30.49$ |
| $r_9 = -29.6285$ | $d_9 = 3.380$ | | |
| $r_{10} = -9.6946$ | $d_{10} = 1.500$ | $n_{d5} = 1.83481$ | $v_{d5} = 42.72$ |
| $r_{11} = -29.2649$ | | | |

Zooming Spaces

| f | 36.3 | 70.2 |
|---|---|---|
| d | 10.2609 | 2.7000 |

Aspherical Coefficients

1st surface $A_4 = -0.10462 \times 10^{-3}$
$A_6 = -0.32445 \times 10^{-6}$
$A_8 = -0.42618 \times 10^{-7}$
$A_{10} = 0.74143 \times 10^{-9}$
$A_{12} = -0.66159 \times 10^{-11}$ 3rd surface $A_4 = 0.24337 \times 10^{-5}$
$A_6 = 0.59652 \times 10^{-6}$
$A_8 = -0.14084 \times 10^{-7}$
$A_{10} = 0.22791 \times 10^{-9}$
$A_{12} = -0.22537 \times 10^{-11}$ 8th surface $A_4 = 0.10282 \times 10^{-3}$
$A_6 = -0.11596 \times 10^{-5}$
$A_8 = 0.73822 \times 10^{-7}$
$A_{10} = -0.13560 \times 10^{-8}$
$A_{12} = 0.10032 \times 10^{-10}$ (1) $f_W/f_{LW} = 0.47$
(2) $D_4/D_2 = 0.47$
(3) $f_W/f_{L1} = -0.96$
(4) $r_{NF}/f_W = 0.54$ As can be understood from the foregoing, the present invention provides a compact yet high-performance zoom lens system which comprises a reduced number of up to about 5 lens elements and has a reduced total lens thickness. This zoom lens system is chiefly suitable for use on lens shutter cameras having a zoom ratio of about 2.

What we claim is:

1. A zoom lens system which includes:

a first lens group having positive power and a second lens group having negative power in order from the object side, and in which:

the focal length thereof is varied by varying a separation between said first and second lens groups, wherein:

said first lens group includes a lens component of weak power, a negative meniscus lens component which is located on the object side of said lens component of weak power and is convex on the object side and a positive lens component located on the image side of said lens component of weak power, and conforms to the following conditions (1) and (2):

$$-0.35 < f_W/f_{LW} < 0.9 \qquad (1)$$

$$0 \leq D_4/D_2 < 1.3 \qquad (2)$$

where $f_W$ is the focal length of the overall system at the wide-angle end, $f_{LW}$ is the focal length of said lens component of weak power in the first lens group, $D_2$ is the axial distance between the lens component of weak power in the first lens group and the negative meniscus lens component which is located on the object side thereof, and $D_4$ is the axial distance between the lens component of weak power in the first lens group and the positive lens component which is located on the image side thereof.

2. The zoom lens system as claimed in claim 1, wherein said lens component of weak power has positive power and conforms to the following condition (1)':

$$0 < f_W/f_{LW} < 0.9 \qquad (1)'$$

3. The zoom lens system as claimed in claim 2, wherein said lens component of weak power is a meniscus lens component convex on the object side.

4. The zoom lens system as claimed in claim 1, wherein said first lens group includes an aspheric surface.

5. The zoom lens system as claimed in claim 1, wherein said negative meniscus lens component includes an aspheric surface whose negative power becomes weak as it is farther off the optical axis.

6. The zoom lens system as claimed in claim 1, wherein said lens component of weak power includes an aspheric surface.

7. The zoom lens system as claimed in claim 1, wherein said second lens group includes an aspheric surface.

8. The zoom lens system as claimed in claim 1, wherein said lens component of weak power is formed of plastic.

9. The zoom lens system as claimed in claim 2, which conforms to the following condition (1)'':

$$0 < f_W/f_{LW} < 0.6 \qquad (1)''$$

10. The zoom lens system as claimed in claim 1, wherein said second lens group includes a positive lens component.

11. The zoom lens system as claimed in claim 10, wherein said second lens group consists of one positive lens and one negative lens.

12. The zoom lens system as claimed in claim 1, wherein said second and third lens components are cemented to each other.

13. The zoom lens system as claimed in claim 1, which conforms to the following condition (3):

$$-1.5 < f_W/f_{L1} < -0.3 \qquad (3)$$

where $f_{L1}$ is the focal length of the negative meniscus lens component of the first lens group.

14. The zoom lens system as claimed in claim 13, which conforms to the following condition (3)':

$$-1.2 < f_W/f_{L1} < -0.5 \qquad (3)'$$

15. The zoom lens system as claimed in claim 1, which conforms to the following condition (4):

$$0.3 < r_{NF}/f_W < 2.0 \qquad (4)$$

where $r_{NF}$ is the radius of curvature of the object-side surface of the negative meniscus lens component of the first lens group.

16. The zoom lens system as claimed in claim 15, which conforms to the following condition (4)':

$$0.4 < r_{NF}/f_W < 1.6 \qquad (4)'$$

17. The zoom lens system as claimed in claim 1, wherein an aperture stop is located between said first and second lens groups.

* * * * *